Dec. 4, 1945.　　　C. R. SIMPKINS　　　2,390,277
WIENER VENDING MACHINE AND PROCESS
Filed Nov. 20, 1939　　　7 Sheets-Sheet 1

INVENTOR.
Carl R. Simpkins
BY
ATTORNEY.

Dec. 4, 1945.  C. R. SIMPKINS  2,390,277
WIENER VENDING MACHINE AND PROCESS
Filed Nov. 20, 1939  7 Sheets-Sheet 3

INVENTOR.
Carl R. Simpkins
BY
ATTORNEY.

Dec. 4, 1945.　　　　C. R. SIMPKINS　　　　2,390,277
WIENER VENDING MACHINE AND PROCESS
Filed Nov. 20, 1939　　　7 Sheets-Sheet 4

INVENTOR.
Carl R. Simpkins
BY
ATTORNEY.

Dec. 4, 1945.    C. R. SIMPKINS    2,390,277
WIENER VENDING MACHINE AND PROCESS
Filed Nov. 20, 1939    7 Sheets-Sheet 5

INVENTOR.
BY Carl R. Simpkins
ATTORNEY.

Dec. 4, 1945.   C. R. SIMPKINS   2,390,277
WIENER VENDING MACHINE AND PROCESS
Filed Nov. 20, 1939   7 Sheets-Sheet 6

INVENTOR.
BY Carl R. Simpkins
ATTORNEY.

INVENTOR.
Carl R. Simpkins
BY
ATTORNEY.

Patented Dec. 4, 1945

2,390,277

UNITED STATES PATENT OFFICE 2,390,277

WIENER VENDING MACHINE AND PROCESS

Carl R. Simpkins, Los Angeles, Calif., assignor to Samuel Verner McConnell, Seattle, Wash.

Application November 20, 1939, Serial No. 305,318

11 Claims. (Cl. 219—19)

This invention relates to an apparatus for and a process of cooking and vending wieners, and more particularly to such an apparatus and process in which a plurality of previously prepared and wrapped wiener sandwiches are adapted to be successively presented, in response to the insertion of coins into the machine, to a cooking stage for cooking and for subsequent delivery to the purchaser.

This invention constitutes an improvement upon Patent No. 2,139,690, issued December 13, 1938, to S. V. McConnell et al.

It is one object of this invention to provide a process of cooking wiener sandwiches previously enclosed in suitable wrapping material, such as Cellophane or the like, in which a plurality of such sandwiches are successively conveyed to a cooking unit, at which stage in response to suitable timing mechanism the sandwich is contacted by cooking elements for a predetermined period of time, is then released by said cooking elements and delivered to the purchaser, the elements of the machine then returning to original position for succeeding operations.

It is a further object of this invention to provide a machine for carrying out the above identified process, which is novel and economical in construction.

Further objects of the invention will appear hereinafter.

Referring to the drawings.

Figure 1:
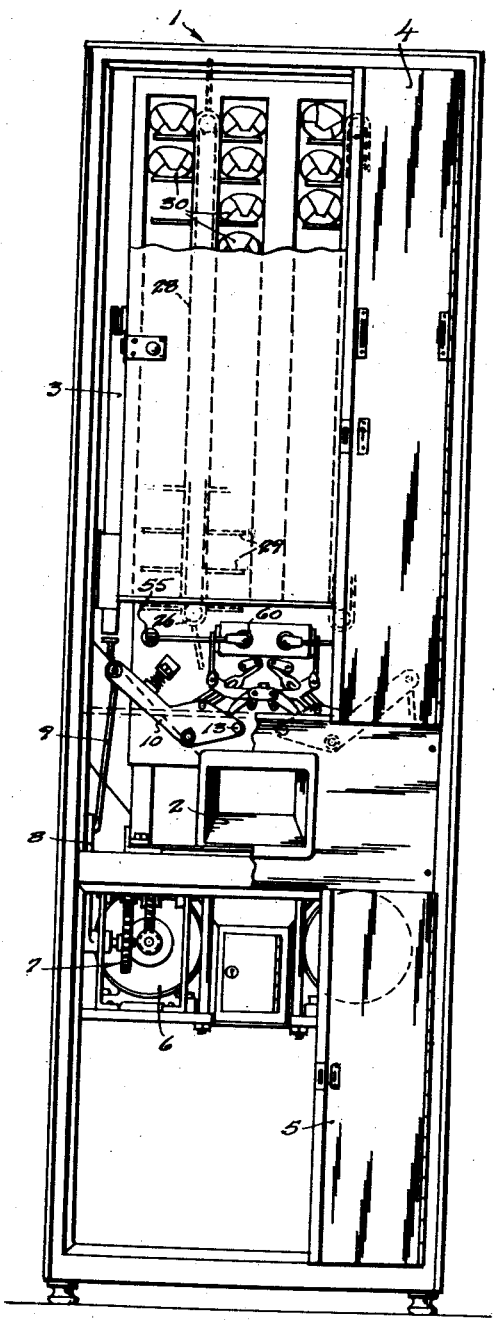
Figure 1 is a front elevational view showing a cabinet in which is housed wiener-vending structure according to the present invention, the doors of the cabinet being partly open to expose portions of the working mechanism.
Figure 2:
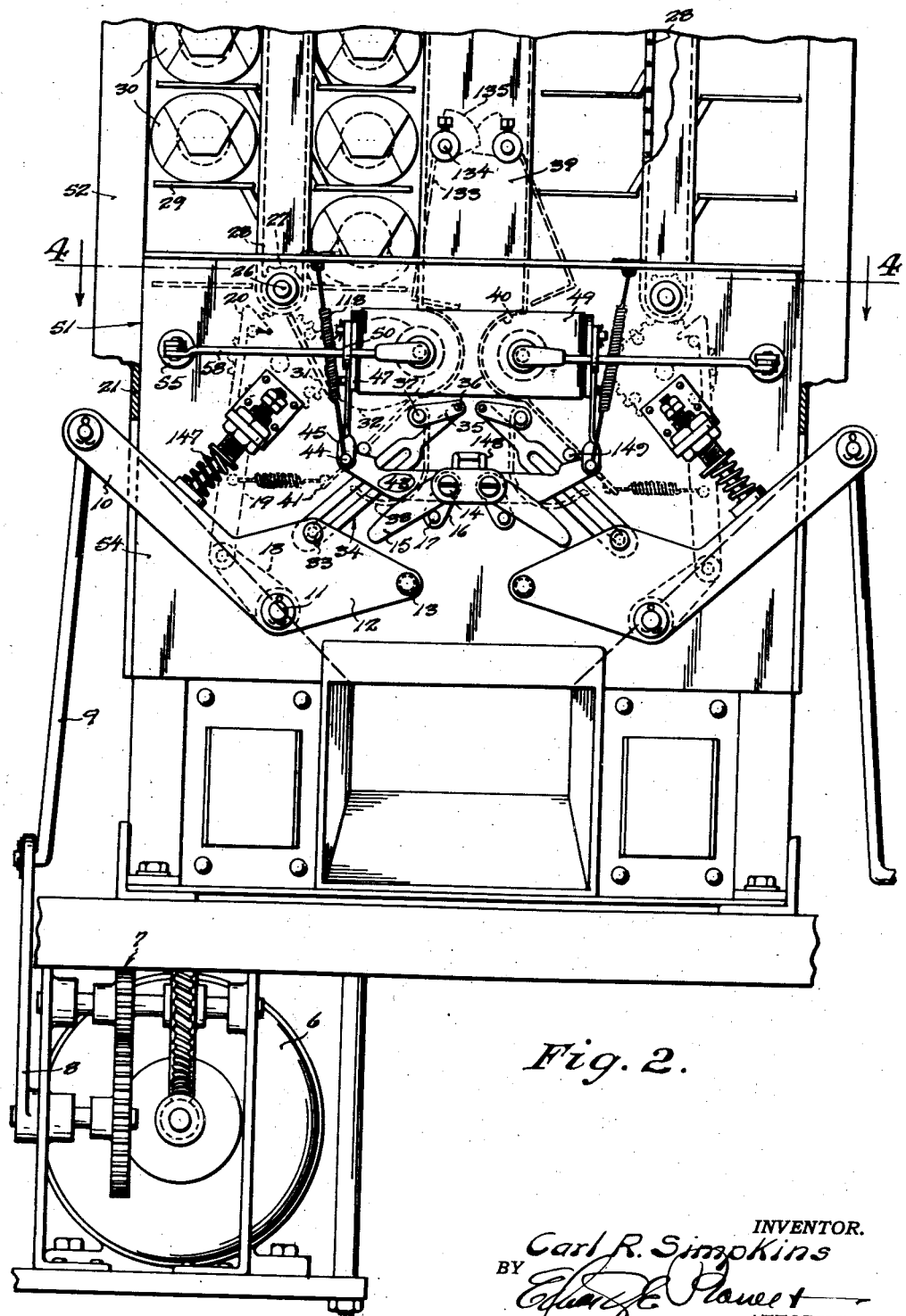
Fig. 2 is a fragmentary front elevational view of said working mechanism taken to an enlarged scale.

Referring more particularly to the drawings, there is shown a cabinet 1 for housing the mechanism. The cabinet is provided with a delivery chute 2 in the front thereof for delivering the cooked wiener sandwiches to the purchasers. A coin slot 3 is provided for the insertion of coins to actuate the mechanism. A door 4 may be provided in the upper half of the cabinet and a second door 5 may be provided in the lower half of the cabinet. Referring more particularly to Fig. 2, there is illustrated a motor 6, suitable speed reduction mechanism 7 actuating crank arm 8, connecting a link 9 to lever 10. The lever 10 is secured upon a pivotally-mounted shaft 11. An extension 12 formed integral with the lever 10 is provided carrying a cam engaging roller 13. A shaft 14 is provided, upon which is loosely pivoted a cam member 15. Formed upon shaft 14 is a lug 16 carrying a pin 17. Secured to the shaft 11 at the rear thereof is an arm 18 pivotally connected to a link 19 having a hook 20 formed at the upper end thereof.

A housing 21 is provided, upon the rear wall 22 of which is mounted a pinion 23 having hook engaging members 24 formed upon the rear face thereof. The hook 20 is adapted to engage the engaging members 24 upon the pinion 23 upon the operation of the lever 10 to rotate the pinion 23, which in turn rotates a pinion 25 engaged by said pinion 23 and carried by a shaft 26. Centrally disposed upon the shaft 26 is a sprocket 27 carrying a chain 28. Mounted upon the chain 28 is a plurality of elevator members 29 adapted to carry a plurality of previously wrapped wiener sandwiches 30. The sandwiches 30 are preferably prepared by slicing in half a bun of the normal character used for this character of food product, coating the walls of the bun with a suitable quantity of mustard, inserting a wiener between the halves of the bun and subsequently sealing the sandwich in a wrapper of Cellophane or equivalent material.

Responsive to each reciprocation of the lever 10 and partial revolution of the pinion 23, the elevators 29 carrying the sandwiches 30 are propelled about the sprocket wheel 27. In each such movement, one of the elevators 29 will assume the position illustrated by the dotted line 31 of Fig. 2, thereby placing a sandwich in the position shown in the dotted lines 32 of Fig. 2.

Also characterizing the extension 12 is a pin 33 which engages a lost-motion mechanism 34. This lost-motion mechanism is pivotally connected as at 36 to a link 35, and 37 denotes a shaft which carries and is pivotally actuated by said link. Shaft 37 carries a set of gripping fingers 38 shown in dotted lines in Fig. 2. Within the housing 21 is an internal partition 39, the end of which is curved as at 40 and terminates in angularly disposed fingers 41. In response to the reciprocation of the lever 10 through the lost motion mechanism 34 and link 35 the shaft 37 is rotated, causing the fingers 38 to rise and grip the sandwich 30 against the curved portion 40 of partition 39 to securely hold said sandwich in position for cooking. The fingers 38 are spaced suitably to pass between the fingers 41 and also the fingers 42 constituting the supporting member of the elevators 29.

Figure 6:
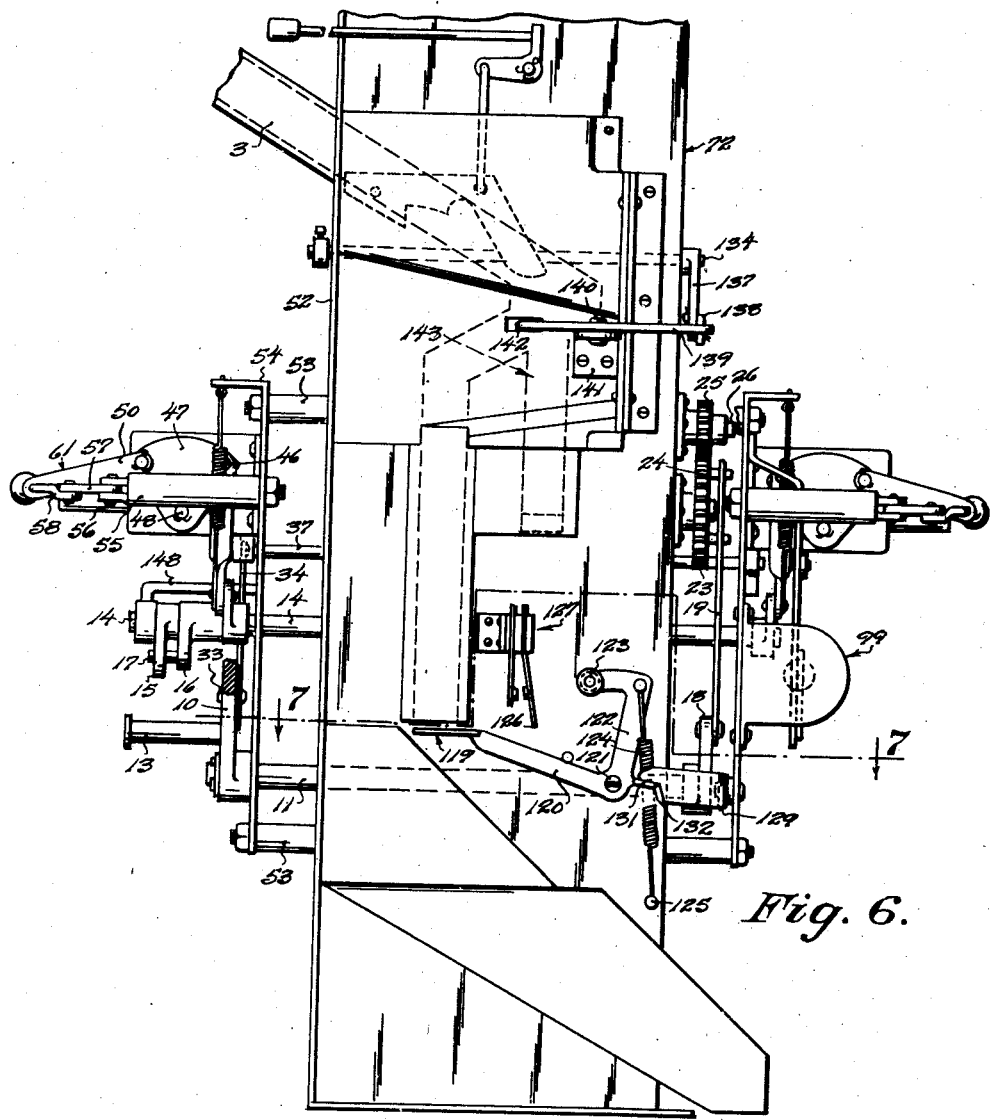
Fig. 6 is a fragmentary side elevational view of the machine with the scale corresponding to that of Figs. 2, 3 and 4.

Also acting by the downward stroke of said lever 10, the cam engaging roller 13 on the extension 12 passes the loosely pivoted cam member 15. Upon the upward stroke of the lever 10, this roller 13 acts to press the cam 15 down upon the pin 17 carried by the lug 16 which lug, being secured to the shaft 14, rotates the latter. Fixed to the shaft 14 and rotated therewith is an arm 43 at the outer end of which is pivoted at 44 a link 45. The link 45 is pivoted at its upper end 46 to a quadrant 47, which quadrant is pivotally mounted as at 48 to a bracket 49 (see Fig. 6). Pivoted from the front of said quadrant 47 is a link 50.

Figure 3:
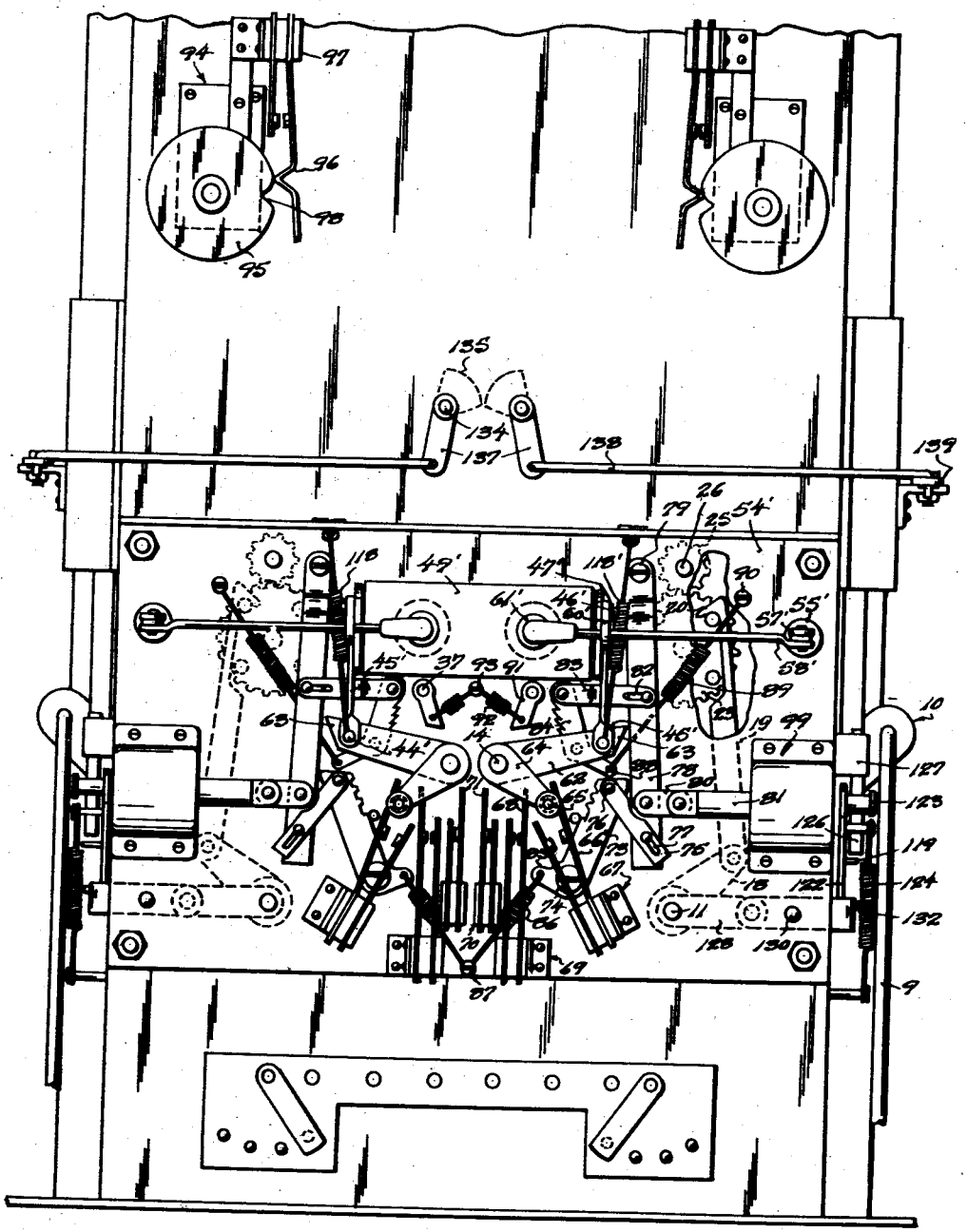
Fig. 3 is a fragmentary rear elevational view thereof.
Figure 9:
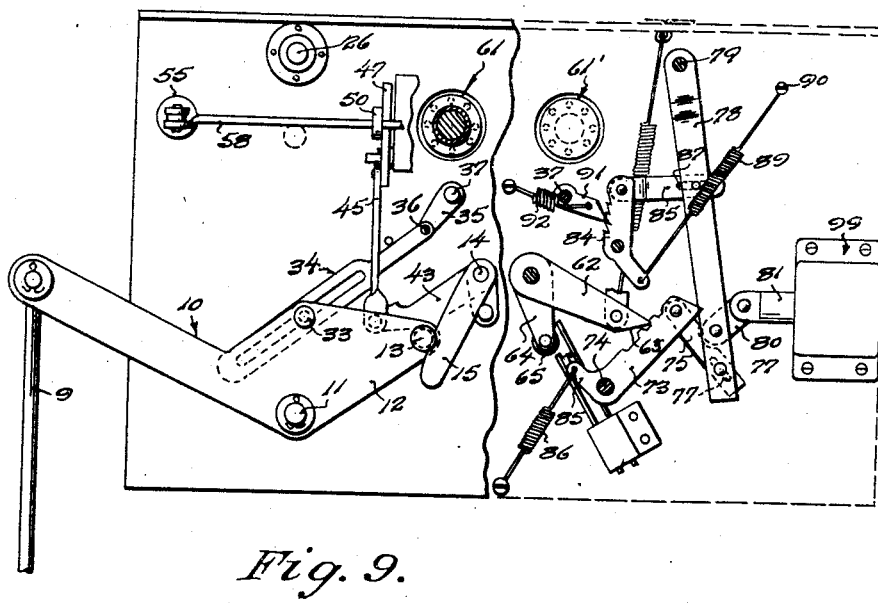
Fig. 9 is a composite view showing in one half the position of parts of the working mechanism of the machine at the front of the latter and in the other half the position of parts of the working mechanism at the back of the machine.

Mounted upon the front wall 51 of the housing 21 are spacers 53 carrying a panel 54, and mounted upon this panel is a post 55 to the front end of which is pivoted at 56 a link 57. The link 57 has pivoted thereto a link 58, which link 58 passes through an aperture 59 (Fig. 4) in link 50. At the front end of the link 58 there is formed a socket 60 engaging the cooking element 61. As most clearly illustrated in Figs. 3 and 9, the shaft 14 extends through the machine and fixedly carries upon the rear end thereof a pawl 62, having a beveled end 63 for purposes which will appear hereinafter. Pivoted upon the pawl 62 at 44' is a link 45' which in turn is pivoted at 46' to the upper rear end of quadrant 47'. The quadrant 47' is pivoted as at 48' to a bracket 49'. Pivoted from the upper front of quadrant 47' is a link 50'.

A panel 54' is provided which is secured to the rear wall 22 of housing 21, and on this panel is a post 55' to which is pivoted at 56' a link 57'. A link 58' is pivoted to the end of link 57' and passes through an aperture 59' in link 50'. A socket 60' is provided upon the end of link 58', engaging cooking element 61'.

Responsive to the rotation of the shaft 14, the arm 43 and the pawl 62 through links 45 and 45' pivoted to the quadrants 47 and 47' rotate said quadrants. The rotation of the quadrants 47 and 47' withdraws the links 50 and 50' toward the center of the machine, thereby pulling links 58 and 58' inwardly, causing sockets 60 and 60' to press cooking elements 61 and 61' into engagement with the wiener, as will be hereinafter described.

Securely mounted upon the shaft 14, at the rear thereof, is an arm 64 carrying an insulated roller 65. In its normal position the insulated roller 65 is adapted to engage one end 66 of a main switch 67 and hold the same open. Responsive to rotation of the shaft 14, the arm 64 carrying the roller 65 permits the end 66 of the main switch 67 to close, thereby closing the main circuit. Further rotation of the shaft 14 brings the insulated roller 65 into contact with one end 68 of a cooking switch 69, thereby energizing the cooking circuit. Another switch 70 is shown having an end 71 adapted to be engaged by the insulated roller 65. As shown, the switch 70 is positioned to one side of the cooking switch 69 for clarity of illustration but in practice it has been found preferable to mount the switch 70 in line with the switch 69 for simultaneous engagement of the insulated roller 65 with the ends 68 and 71 of the switches 69 and 70, respectively. The purpose of the switch 70 will be explained hereinafter.

Figure 4:
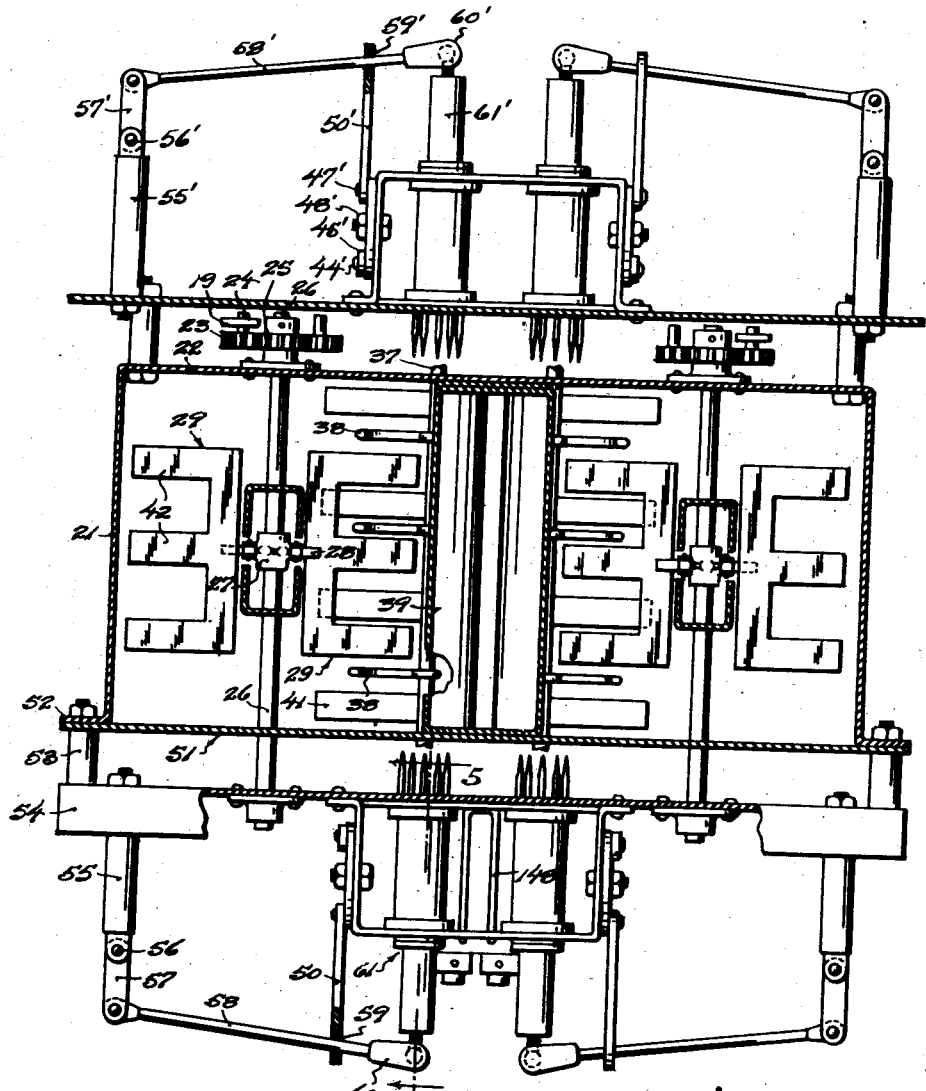
Fig. 4 is a horizontal section on line 4—4 of Fig. 2.
Figures 10, 11:
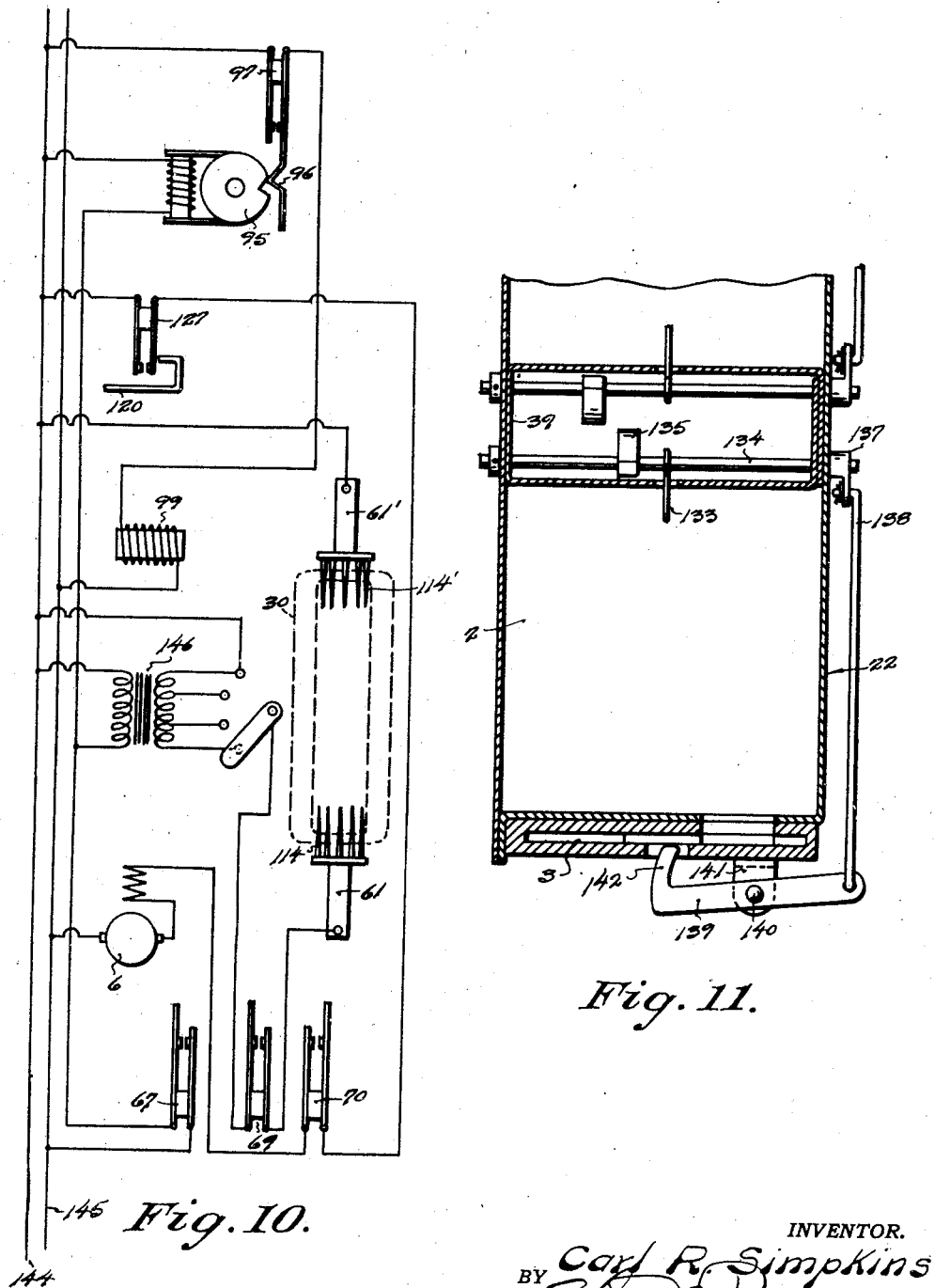
Fig. 10 is a wiring diagram of the various electrical circuits used.
Fig. 11 is a horizontal section illustrating related parts of the coin control structure.

With particular reference to Figs. 4 and 10, it will be noted that responsive to the rotation of the shaft 14 the pawl 62 will dip downward and the beveled surface 63 will engage the upper end 72 of a ratchet 73 pivoted at 74 to the panel 54'. A lug 85 is formed upon the lower end of ratchet 73 and a coil spring 86 is attached thereto having its other end fixed as at 87 to the panel 54'. A link 75 is pivoted at 76 upon the upper end of ratchet 73. The link 75 has a lost motion slot 77 formed at its other end, in which is pivoted at the lower end a lever 78. The lever 78 is given a pivotal mounting of its upper end 79 to the panel 54'. Pivotally connected to the lower end of said lever 78 above the connection with the link 75 is a link 80 having its other end pivotally connected to the core 81 of a solenoid 99. Also pivoted upon the lever 78 by lost motion slot 82 is a link 83 pivoted to a ratchet member 84. A lug 88 is formed upon one end of the ratchet 84 and a coil spring 89 is attached thereto, the other end being secured as at 90 to the panel 54'.

Mounted upon the rear of the shaft 37 is a pawl 91 adapted to engage the ratchet 84. A spring 92 is attached to the pawl 91 and the other end thereof is secured to the panel as at 93.

It will thus be apparent that upon the rotation of the shaft 14 and of the shaft 37 the pawl 62 will force the beveled surface 63 into engagement with the ratchet 73 which, by means of lost motion slots 77 and 82, will yield against the pressure of the springs 86 and 68, thereby locking the mechanism. The pawl 91 will similarly engage the ratchet 84 thereby locking the gripping fingers 38 in cooking position.

It will be noted that simultaneously with the locking of the various mechanisms as above described, the insulated roller 65 has permitted the energizing of the main circuit through the switch 67. Through circuits later to be described, a timing mechanism 94 (Figs. 3 and 10) is energized. A cam 95 is provided upon the timing mechanism 94, engaged by cam engaging element 96 of a switch 97. Upon the completion of one complete rotation of the cam 95, the cam engaging element 96 will drop into the notch 98 of cam 95, closing the switch 97. The closing of the switch 97 energizes the solenoid 99, withdrawing the core 81.

Figure 5:
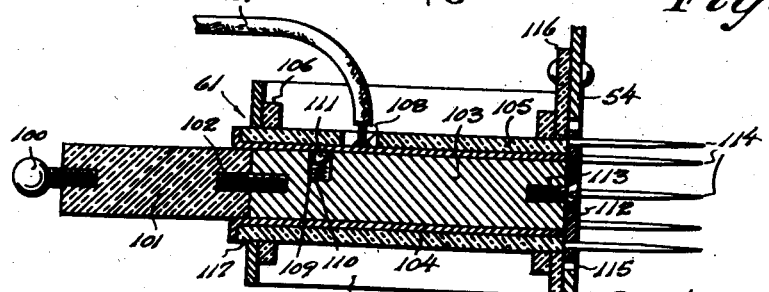
Fig. 5 is a longitudinal vertical section to an enlarged scale detailing one of the cooking units of the machine.

It will also be noted that directly succeeding the starting of the timing mechanism 94, the switch 69 is closed by the insulated roller 65, thereby closing the cooking circuit. Referring to Fig. 5, it will be seen that I have provided a cooking member 61 comprising a ball 100 adapted to be engaged by the socket 60. The ball 100 is mounted upon one end of an insulated rod 101 which is secured to a stem 102. A metallic core 103 is provided surrounded by a suitable sleeve 104 preferably formed of brass. An insulating bushing 105 may surround the sleeve 104 and insulating washers 106 may be provided at both ends of the bushing. As shown, the cooking unit 61 is mounted in the bracket 49 and the panel 54. Current is supplied to the cooking unit by means of a power source 107 having connection with the sleeve 104 as at 108. In order to insure continued electrical contact between the core 103 and the sleeve 104, a socket 109 is provided in core 103, in which is mounted a coil spring 110 bearing upon a ball 111. It will be appreciated that the ball 111 bears upon the inner surface of the sleeve 104 at all times.

Upon the inner end of the core 103 a metallic plate 112 is fixedly mounted by suitable attaching means 113 and carries a plurality of wiener engaging elements 114. An aperture 115 is provided in the panel 54 and is made larger than the diameter of the metallic plate 112 to prevent electrical contact therebetween. An insulating plate 116 may be secured to the panel 54. Responsive to the action of the socket 60, as heretofore described, the elements 101 and 103 of the cooking unit 61 move forwardly within the sleeve 104, thereby bringing the wiener engaging elements 114 into engagement with the wieners to complete the cooking circuit.

Through circuits hereinafter to be described, electric current is passed from the wiener engaging elements 114 through the wiener to cook the same. It will, of course, be understood that a similar wiener engaging element 61' is simultaneously engaged with the other end of the wiener.

At the completion of the cooking interval, the cam engaging element 96 of the timing mechanism 94 enters the notch 98 of the cam 95, closing the timing circuit. Energized by this circuit, the solenoid 99 withdraws the core 81, thereby unlocking the mechanism. Through the links 80 and 76, the ratchet 73 will be withdrawn from the pawl 62, thereby releasing the same. A spring 118 attached to the pawl 62, together with a spring 118' attached to the link 43, return these members to their original positions. Simultaneously through the links 80, 78 and 83, the ratchet 85 is withdrawn from engagement with the pawl 91 and responsive to the action of the spring 92 the pawl 91 is returned to its initial position. It will be appreciated that under the force of the springs 118 and 118' rotating the shaft 14, the cooking members 61 are withdrawn to their original position and all of the other elements restored to their proper position for the beginning of another cooking operation.

It will also be appreciated that with the return of the pawl 91 to its original position, responsive to the force of the spring 92 the shaft 37 is rotated, thereby releasing the fingers 38 and permitting the wiener 30 to drop down the delivery chute 2 for delivery to the purchaser.

The machine is adapted to be operated in response to the insertion of coins in the coin slot 3. In the upper portion of this slot are shown details of a slug detecting device which is or may be conventional in design. A coin dropped in the coin slot 3 passes down the path indicated in dotted lines in Fig. 6 to hit the face 119 of the lever 120.

The lever 120 is pivoted as at 121 and an extension 122 carries at the upper end thereof an insulated roller 123. A suitable coil spring 124 is attached to the upper end of the extension 122 and the other end thereof is attached to the housing 21 as at 125. Responsive to the impact of the coin upon the face 119 of the lever 120, the insulated roller 123 is brought into contact with one element 126 of a switch 127. The switch 127, through circuits hereinafter to be described, actuates the motor 6.

Figure 7:
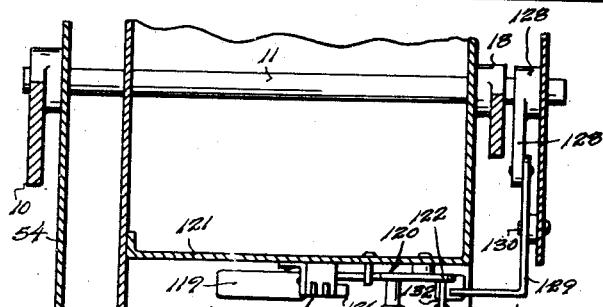
Fig. 7 is a fragmentary horizontal section on line 7—7 of Fig. 6.

The motor 6, through links 8, 9 and lever 10, imparts a partial rotation to the shaft 11, as previously described. Referring to Fig. 7, it will be seen that the shaft 11 fixedly carries upon one end thereof a lever 128. The lever 128 has pivoted from one end a crank 129. The crank 129 is pivoted to the panel 54 as at 130. The under surface of the crank 129 is notched as at 131 (see Fig. 6). A lug 132 is formed upon the extension 122 and is positioned so as to be contacted by said notch 131.

The operation of the above described device is as follows:

After the insulated roller 123 has been brought into contact with the member 126 of switch 127 to actuate the motor 6, the rotation of the shaft 11 causes a rocking of the crank 129. The notched end of the crank 129 upon its downward motion contacts the lug 132, thereby removing the insulated roller 123 from contact with the member 126 and breaking the motor circuit. Having broken the motor circuit, the notched portion 131 will continue past the lug 132 to permit a succeeding coin to actuate the machine.

Figure 8:
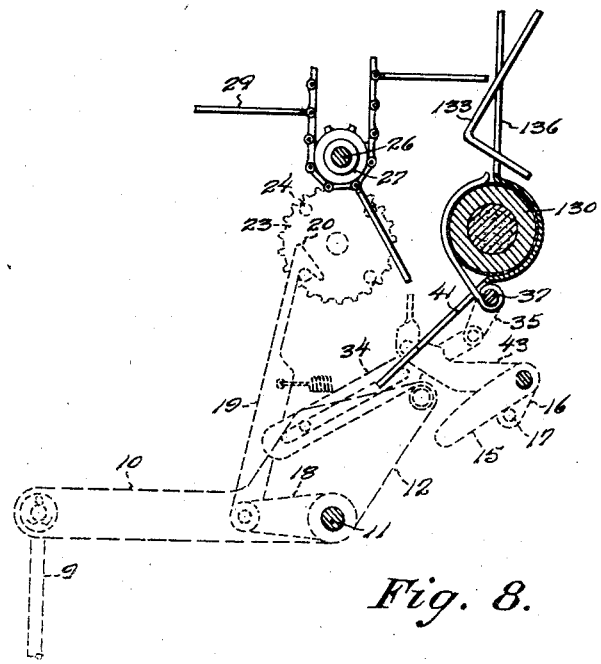
Fig. 8 is a fragmentary longitudinal vertical section illustrating a portion of the coin control mechanism in its relation to the conveyor chain which carries the wiener sandwiches into cooking positions, the view showing the mechanism tripped to actuate the control.

As can probably be best seen from an inspection of Figs. 2 and 11 there is provided an L shaped arm 133 pivoted from a shaft 134. Mounted on the shaft 134 is a counterweight 135 adapted to normally swing the L shaped arm through the slot 136 in partition 39 so as to extend into the path of the wiener, as shown in Fig. 8. Under normal cooking operations, the presence of a wiener 30 upon the elevator 29 will force the L shaped arm to the right (see Fig. 8) and out of the cooking compartment. In the absence of a wiener upon the elevator 29, the L shaped arm 133 consequently takes the position shown in Fig. 8 and rotates the shaft 134 which, through the medium of the link 137 and the rod 138, thereby rocks the lever 139. The lever 139 is pivoted at 140 in a bracket 141 secured to the side of the casing. Upon one end of the lever 139 is a coin deflector 142.

The slug detecting device employed with this machine has an opening 143 (Fig. 6) provided in the coin path, which normal coins are expected to jump. The coin deflector 142 is adapted to be positioned in the normal path of the coins when the L shaped arm 133 is in the position shown in Fig. 8, in other words when the machine is empty. A coin striking the coin deflector 142 will be deflected, in the same manner as are false coins and slugs by the slug detecting device, for return to the purchaser through the chute 2. It will thus be seen that an insertion of a coin in the coin slot 2 when no wiener sandwiches are contained in the machine results in a return of the purchaser's coin.

In the above description of the device, half of the machine only has been described. It will be appreciated that the other half of the machine is identical with the half described and is employed merely to increase the capacity of the machine and to make the facilities of the machine available to two purchasers at the same time. It is obvious that additional units may be employed and, without departing from the design of this machine, machines having three, four, or more, separate units may be provided.

As previously noted, a switch 70 is provided adapted to be engaged by the insulated roller 65 simultaneous with its engagement with the switch 69. As will appear from the wiring diagram, the contact of the insulated roller with the switch 70, resulting in the opening of that switch, breaks the motor circuit so that the insertion of a second coin into the coin slot, while a wiener is being cooked in response to the insertion of a previous coin, will not start the motor and jam the machine. However, upon the return of the mechanism to its initial position at the conclusion of the cooking period, as hereinbefore described, the switch 70 will be closed and the machine started by the secondly inserted coin, as expected by the purchaser.

In Fig. 10 the wiring diagram of the machine is shown. As shown, power is secured from wires 144 and 145, being the conventional wires of the ordinary alternating current generally supplied. One side of the motor 6 is connected to the source 145 and the other side of the motor is connected through safety switch 70 and coin controlled switch 127 to the other source 144. One side of the timing mechanism 94 is shown connected to the source 144 and the other end of the timing mechanism is shown connected through the main switch 67 to the other source 145. One end of the solenoid 99 is shown connected to the source 144 through the switch 97 and the other end thereof is shown connected to the source 145. A transformer 146 is provided, the primary of which is connected to the source 144 and to the main switch 67, as shown. The secondary of the transformer is connected through the cooking switch 69 and the circuit comprising the cooking elements 61, the wiener 30 and the cooking element 61', to the source 144.

The operation of the device is as follows:

In response to the insertion of a coin in the coin slot 3, the switch 127 is closed through the medium of the arm 120 and the insulated roller 123, thereby energizing the motor. The motor 6 through the medium of the links 8 and 9 and lever 10, imparts the heretofore described motion to the shafts 14 and 37. The rotation of the shafts 14 and 37 causes the positioning of a wiener in the cooking position and the contact of said wiener by the cooking elements 61 and 61'. The described closing of the switch 67 actuates the timing device 94 and the closing of the switch 69 energizes the cooking circuit. Simultaneously with the closing of the switch 69 the motor safety switch 70 is opened in order to prevent further motion of the motor during the cooking operation. Following one complete revolution of the timing cam 95, the solenoid circuit is energized by the switch 97 and the core 81 is withdrawn into the solenoid 99, thereby unlocking the mechanism, returning the various elements to their original position, and releasing the wiener down the delivery chute 2 to the purchaser. As hereinbefore described, the coin return element 142 has functioned to return the coin to the purchaser after the machine is empty. It will be appreciated that the transformer 146 is utilized in order to provide a suitable current through the wiener.

In practice I have found it advantageous to employ a brake 147 (Fig. 2) bearing upon the lever 10 to prevent coasting of the motor 6. Likewise I have found it advantageous to employ a stop 148 in line with the cam 15 in order to assure that the cam 15 following the initial contact with the roller 13 will drop back into the position shown in Fig. 2. I have also found it advantageous to employ a stop 149 to retain the arm 43 in the position shown in Fig. 2 and limit its movement under the influence of the spring 118'.

It will thus be seen that I have provided a process and a machine in which, in response to the insertion of suitable coins, a plurality of previously wrapped wiener sandwiches are presented successively to a cooking stage wherein they are contacted for a predetermined interval of time by electric cooking elements, following which operation they are released and delivered to the purchaser and the operating elements of the machine return to their original positions in preparation for a succeeding cooking operation.

No claim is made to the coin selecting device depicted in this application, which constitutes no part of my invention.

While the particular forms of the invention herein described are well adapted to carry out the objects of the invention, it is to be understood that various modifications and changes may be made without departing from the principles of the invention, and the invention includes all such modifications and changes as come within the scope of the appended claims.

I claim:

1. In a machine for broiling and vending wiener sandwiches, the combination of conveyor means for successively presenting a plurality of wiener sandwiches to a cooking stage, finger means for positively retaining said sandwiches at said cooking stage during the cooking operation, electrodes for contacting said successively presented wiener sandwiches to establish an electric current through said sandwiches, means for maintaining said electric current a predetermined period of time, and means for releasing said sandwiches for delivery to a purchaser.

2. In a machine for broiling and vending wiener sandwiches, the combination of a motor, means responsive to said motor for presenting a plurality of wiener sandwiches successively to a cooking stage, finger means for positively retaining said sandwiches at said cooking stage during the cooking operation, a pair of electrodes for contacting said sandwiches to establish an electric current through said sandwiches, means responsive to said motor for contacting said sandwiches with said electrodes, means for shutting off said motor, time controlled means for releasing said electrodes from said sandwiches, means for delivering said sandwiches to a purchaser, and means preventing the restarting of said motor prior to the delivery of the sandwich being cooked to the purchaser.

3. In a machine for broiling and vending wiener sandwiches, the combination of a motor, means responsive to said motor for presenting a wiener sandwich to a cooking stage, finger means for positively retaining said sandwich at said cooking stage during the cooking operation, a pair of electrodes for contacting said sandwich to establish an electric current through said sandwich, means responsive to said motor for contacting said sandwich with said electrodes, means for positively holding said electrodes in contact with said sandwich, a solenoid, time controlled means for actuating said solenoid, and means responsive to the action of said solenoid for releasing said electrodes from contact with said sandwich for delivery to a purchaser.

4. In a machine for broiling and vending wiener sandwiches, the combination of a motor, means responsive to said motor for presenting a wiener sandwich to a cooking stage, finger means for positively retaining said sandwich at said cooking stage during the cooking operation, a pair of electrodes for contacting said sandwich to establish an electric current through said sandwich, means responsive to said motor for contacting said sandwich with said electrodes, means for positively holding said electrodes and said finger means in contact with said sandwich, a solenoid, time controlled means for actuating said solenoid, means responsive to the action of said solenoid for releasing said electrodes and said finger means from contact with said sandwich, and means for returning the moving parts of said machine to original position to permit a successive operation of said machine.

5. In a machine for broiling and vending wiener sandwiches, means for presenting a wiener sandwich to a cooking stage, means for contacting said wiener sandwich with current carrying electrodes, sandwich-gripping means independent of said electrodes for positively retaining said sandwich at said cooking stage during the cooking operation, means for locking said electrodes and said gripping means in cooking position, a solenoid, means responsive to the action of said solenoid for unlocking said electrodes and said gripping means, and spring means for withdrawing said elctrodes and said gripping means from contact with said sandwich.

6. In a machine for broiling and vending wiener sandwiches, the combination of conveyor means for presenting a plurality of wiener sandwiches successively to a cooking stage, sandwich-gripping means for positively retaining the sandwiches at said cooking stage, electrodes associated with the cooking stage and movable from a normally inoperative position into contacting engagement with the wiener of the gripped sandwiches, means for establishing an electric current through said electrodes and the sandwiches, means for maintaining said electric current a predetermined period of time, and means for releasing said sandwiches from said electrodes and from the cooking stage for delivery to a purchaser.

7. In a machine for broiling and vending wiener sandwiches, a compartment for a wiener sandwich, a stationary cooking stage removed therefrom, means for presenting the sandwich from the compartment to said cooking stage, current-carrying electrodes, means for bringing said electrodes from a position normally inoperative to the presented sandwich into contact with the wiener of the sandwich, means for locking said electrodes in contacting position, a solenoid, means responsive to the action of said solenoid for unlocking said electrodes, and means for withdrawing said electrodes from contact with said sandwich.

8. In a machine for broiling and vending wiener sandwiches, a compartment for a wiener sandwich, a cooking stage removed therefrom, means for presenting the sandwich from the compartment to said cooking stage, current-carrying electrodes, means for bringing said electrodes from a position normally inoperative to the presented sandwich into contact with the wiener sandwich, means for locking said electrodes in said contacting position, a solenoid, and means responsive to the action of said solenoid for releasing said locking means and withdrawing the electrodes from sandwich-contacting position.

9. In a machine for broiling and vending wiener sandwiches, a cooking stage for the sandwich, electrodes supported for movement into and from contact with a sandwich occupying the stage for traversing the sandwich with electric current, a motor, a solenoid, means responsive to the operation of the motor for moving the electrodes into said contact position, means for locking the electrodes in said contact position, and means responsive to the operation of the solenoid for releasing said locking means to permit the electrodes to be withdrawn from the said contact position.

10. In a machine for broiling and vending wiener sandwiches, a cooking stage for the sandwich, electrodes supported for movement into and from contact with a sandwich occupying the stage for traversing the sandwich with electric current, a motor, mechanical connection between the motor and the elctrodes for moving the electrodes into said contact position, a spring yieldingly opposing said motor-responsive movement of the electrodes, means for locking the electrodes in said contact position against the retractive influence of the spring, and means for releasing the locking means to permit the spring to assert its retractive power for withdrawing the electrodes from said contact position.

11. In a machine for broiling and vending wiener sandwiches, a cooking stage for the sandwich, electrodes supported for movement into and from contact with a sandwich occupying the stage for traversing the sandwich with electric current, a spring operatively connected with the electrodes and exerting its energy to normally hold the electrodes out of contact with a sandwich occupying the stage, power devices for moving the electrodes into said contact position against the influence of the spring, means for holding the electrodes in said contact position, and means for releasing the electrodes following a cooking interval to permit the spring to assert its retractive power for withdrawing the electrodes from said contact position.

CARL R. SIMPKINS.